US008844912B2

(12) United States Patent
Naber

(10) Patent No.: US 8,844,912 B2
(45) Date of Patent: Sep. 30, 2014

(54) SHOCK ABSORBER HAVING COMPRESSIBLE FLUID

(75) Inventor: Thomas Naber, Ahaus (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 740 days.

(21) Appl. No.: 12/736,360

(22) PCT Filed: Apr. 8, 2009

(86) PCT No.: PCT/EP2009/002593
§ 371 (c)(1),
(2), (4) Date: Nov. 15, 2010

(87) PCT Pub. No.: WO2009/124743
PCT Pub. Date: Oct. 15, 2009

(65) Prior Publication Data
US 2011/0049774 A1  Mar. 3, 2011

(30) Foreign Application Priority Data
Apr. 8, 2008  (DE) .......................... 10 2008 017 704

(51) Int. Cl.
*F16F 9/05* (2006.01)
*F16F 9/34* (2006.01)
*F16F 9/512* (2006.01)
*F16F 9/04* (2006.01)

(52) U.S. Cl.
CPC ............. *F16F 9/0472* (2013.01); *F16F 9/5126* (2013.01)
USPC .................. 267/64.27; 267/64.11; 267/64.15; 267/122; 267/124; 267/220; 188/282.1; 188/298; 188/322.13; 188/322.15; 188/316

(58) Field of Classification Search
USPC ............. 267/72, 64.11, 64.19, 256, 122, 124, 267/220, 64.15, 64.18, 64.21–64.27; 188/298, 322.15, 322.22, 282.1–282.4, 188/316, 317, 322.13
See application file for complete search history.

(56) References Cited

U.S. PATENT DOCUMENTS 2,361,575 A  *  10/1944  Thompson ................. 267/64.19
3,218,055 A  *  11/1965  Nallinger ................... 267/64.16
(Continued)

FOREIGN PATENT DOCUMENTS

DE  1 144 127  12/1961
DE  69 31 018  4/1971
(Continued)

OTHER PUBLICATIONS

European Patent Office, International Preliminary Report on Patentability and Written Opinion, Oct. 21, 2010, from International Patent Application No. PCT/EP2009/002593, filed on Apr. 8, 2009.

(Continued)

*Primary Examiner* — Anna Momper
*Assistant Examiner* — San Aung
(74) *Attorney, Agent, or Firm* — Kenyon & Kenyon LLP

(57) ABSTRACT

A shock absorber for a vehicle, having a bellows piston, bellows, and a fluid as the damping medium. The shock absorber has a first partition wall, which is situated on the bellows piston, and is implemented to separate a volume area of the bellows piston from a volume area of the bellows. The first partition wall has a first opening, which is implemented to limit a fluid flow between the volume area of the bellows piston and the volume area of the bellows. The shock absorber further has a sprung mass, which is situated inside the shock absorber to influence the fluid flow inside the shock absorber.

25 Claims, 7 Drawing Sheets

(56) References Cited

U.S. PATENT DOCUMENTS

| | | | |
|---|---|---|---|
| 3,880,446 A * | 4/1975 | Muller | 280/124.158 |
| 4,762,308 A | 8/1988 | Geno | |
| 6,644,632 B1 * | 11/2003 | Jaberg | 267/64.21 |
| 8,025,272 B2 * | 9/2011 | Schallmeier | 267/64.21 |
| 2008/0308367 A1 * | 12/2008 | Gilner et al. | 188/298 |

FOREIGN PATENT DOCUMENTS

| | | |
|---|---|---|
| DE | 33 29 327 | 8/1983 |
| DE | 36 41 623 | 6/1987 |
| DE | 103 14 621 | 11/2004 |
| DE | 103 19 568 | 11/2004 |
| EP | 1 464 866 | 10/2004 |
| JP | 07/238969 | 9/1995 |
| WO | WO 89/12766 | 12/1989 |
| WO | WO 2007/068312 | 6/2007 |

OTHER PUBLICATIONS

European Patent Office, Translation of International Preliminary Report on Patentability and Written Opinion, Dec. 23, 2010, from International Patent Application No. PCT/EP2009/002593, filed on Apr. 8, 2009.

* cited by examiner

SHOCK ABSORBER HAVING COMPRESSIBLE FLUID

FIELD OF THE INVENTION

The present invention relates to a shock absorber having a compressible fluid as the damping medium.

BACKGROUND INFORMATION

In vehicles, shock absorber regulators are currently typical. In such regulators, the goal is pursued of stabilizing either the bodywork or the unsprung masses. A regulator typically includes sensors, electronics, and actuators. The switching speed receives particular significance. The more rapidly a movement state may be sensed, analyzed, and readjusted by the actuator, the better. However, parameters such as power consumption and forces are to be considered. Ultimately, the regulation is always only a response to an undesired state. The problem is that such regulators use complex hardware and software and very rapid regulators result in a high power consumption and high wear. However, at the same time the stabilizing of the unsprung masses requires a high speed in particular, because their characteristic frequency is approximately one order of magnitude higher than the characteristic frequency of the structure.

Known regulators have distance, pressure, and/or acceleration sensors, one or more CPUs, and actuator valves, which are valves or electrical force elements, depending on the system. If an undesired movement state is recognized by one or more sensors, the shock absorber may be varied in a range between hard and soft, so that as a result an improving or at least not worsening force may act on the bodywork and/or the axle.

FIG. 11 shows an illustration of a typical air bellows, which may be used as a shock absorber if the bellows piston forms a separate volume, which is connected to the bellows volume by a throttle or a valve having throttling action. The air bellows has a base 302, a bellows piston 304, a bellows rubber 306, and a bellows cover 308.

Air shock absorbers may have an interposed throttle, which may regulate the gas stream.

Up to this point, throttle elements which have a fixed throttle cross section or throttles which have a cross section which changes as a function of the pressure differential in the bellows and in the auxiliary volume have been known.

Prof. Gold showed already in the 1970's that there is a maximum damping work for such damping systems, which may not be increased further using a typical arrangement.

For most applications in vehicles, the damping work resulting therefrom is too low, so that the use as a shock absorber is not possible. A system thus becomes possible for primary shock absorbers of vehicles if the damping work is more than doubled by targeted influence on the throttle during an oscillation amplitude, i.e., at least 10 Hz.

FIG. 12 shows the way in which the throttle must be adjusted between open and closed for the targeted influence. Time t is plotted on the abscissa and amplitude A is plotted on the ordinate. Time intervals 1201 identify states in which the throttle is closed and time intervals 1202 identify states in which the throttle is open.

It is ideal, but technically impossible, for a complete air exchange to occur in an infinitely short time in particular dead centers (TDC, BDC).

In such a system, the damping work is the area in an F-s graph (force-distance graph).

FIG. 13 shows a comparison of a regulated throttle to an unregulated throttle in such an F-s graph. An area 1301, which corresponds to "regulated shock absorber work" and an area 1302, which corresponds to "unregulated shock absorber work," are shown.

The requirement for such a valve and such a regulator is the high regulating speed and the large valve cross sections for the large air mass compensation.

An adjustment by a pressure or distance sensor, which recognizes the dead centers or an approach to the dead centers, in connection with regulation electronics and a special valve, is fundamentally possible.

The high valve and electronics costs and the complex regulator are disadvantageous in such an approach.

SUMMARY OF THE INVENTION

It is the object of the exemplary embodiments and/or exemplary methods of the present invention to provide a shock absorber which allows an improved damping characteristic.

This object is achieved by a shock absorber according to the description herein.

A fundamental idea of the exemplary embodiments and/or exemplary methods of the present invention is based on the answer to the question, which mechanical possibilities are there for the detection of the dead centers with simultaneous reasonable throttle cross-sectional change.

The answer to this question according to the exemplary embodiments and/or exemplary methods of the present invention is a seismic mass, which behaves quasi "earth"-fixed in the event of excitation of the bellows piston by the road and opens or closes overflow channels through the relative movement according to the desired setpoint regulation.

Using such a system, the "detour" of the dead center signal via regulation electronics and an actuator is virtually precluded. The sensor, in this case the reverse direction of the bellows piston relative to the almost "earth-fixed" oscillating mass, switches directly and without a time delay.

According to the exemplary embodiments and/or exemplary methods of the present invention, problems may also be solved which result in the real design possibilities and bring about deviations from the "ideal" damping. The pressure differences in the two volumes may thus possibly result in dynamic effects, which are to be considered. A technical approach solves this problem of the pressure influence completely, in that a slide principle is used instead of a seat principle. On the other hand, the mass is to be sprung and damped. This results in additional undesired forces and at least one characteristic frequency, at which characteristic frequencies of the parts to be damped should in no case lie.

Therefore, according to this first embodiment, a "seismic valve" is proposed for the damping force amplification of a shock absorber based on a compressible fluid.

The exemplary embodiments and/or exemplary methods of the present invention is further based on the idea that the frequency of a mass to be damped, such as a bodywork frequency of vehicle bodywork, may itself be used to produce a fluid flow, which may influence system kinematics. For example, the bodywork frequency may be used to control a valve, which then allows the fluid to flow. According to one embodiment, a regulator may optionally additionally be superimposed on the basic controller.

Therefore, according to this further embodiment, a spring-mass system is proposed, which oscillates at the same characteristic frequency as the mass to be damped, such as the unsprung mass of a vehicle.

All approaches are connected by the shared inventive idea that a relative movement of a moving mass in relation to a valve opening may be used to improve the damping property of the shock absorber.

The exemplary embodiments and/or exemplary methods of the present invention provides a shock absorber for a vehicle, having a bellows piston, a bellows, and a fluid as the damping medium, having the following features: a first partition wall, which is situated on the bellows piston, and is implemented to separate a volume area of the bellows piston from a volume area of the bellows; a first opening in the first partition wall, the first opening being implemented to limit a fluid flow between the volume area of the bellows piston and the volume area of the bellows; and a sprung mass, which is situated inside the shock absorber to influence the fluid flow inside the shock absorber.

The shock absorber may be a bellows and in particular an air bellows. The shock absorber may be situated between a vehicle axle and a vehicle frame, in order to damp movements between the axle and the vehicle frame relative to one another. The bellows piston may be implemented as a dimensionally stable body, which may form an unrolling body for the bellows. The bellows may be made of an elastic material and may be fixedly connected to the bellows piston. The volume area of the bellows piston and the volume area of the bellows may be filled using the fluid. An internal pressure caused by the fluid may counteract an unrolling movement of the bellows via the bellows piston. The partition wall may be a dimensionally stable element, such as a plate, which may be fixedly connected to the bellows piston. A movement of the bellows piston thus results in a corresponding movement of the partition wall. The partition wall may tightly seal the bellows piston in relation to the bellows with respect to the fluid, so that a fluid exchange between the bellows piston and the bellows may exclusively occur via the opening in the partition wall. The sprung mass may be an oscillatingly mounted or suspended mass. The sprung mass may influence the fluid flow, in that it entirely or partially closes the opening in the partition wall. Furthermore, the sprung mass may influence the fluid flow in that it provides a pressure differential between a side of the partition wall facing toward the sprung mass and a side facing away from the sprung mass because of a relative movement in relation to the partition wall.

According to one specific embodiment, the sprung mass may be a sprung mass which has a predetermined inertia, so that the sprung mass substantially remains at rest in the event of a movement to be damped of the bellows piston, because of the predetermined inertia. The sprung mass may thus form a seismic mass which remains at rest in response to a movement of the bellows piston. The inertia of the sprung mass may be implemented in such a way that the sprung mass substantially remains at rest in relation to typical movements of the bellows piston, which are caused by roadway irregularities, for example. Remaining substantially at rest may include slight deflections of the sprung mass, due to the movement of the bellows piston here, which cannot be avoided at acceptable expenditure.

According to a further specific embodiment, the sprung mass may have a resonant frequency which is tuned to a resonant frequency of a mass to be stabilized by the shock absorber. In this way, the resonant frequency may be used to control or regulate the damping action of the shock absorber.

For example, the sprung mass may be implemented to at least partially close the first opening in the event of a specified first deflection relative to the first partition wall. The first opening may thus form a valve whose opening behavior may be controlled by the sprung mass.

The shock absorber may have a second partition wall having a second opening, the sprung mass being able to be situated between the first and the second partition walls; the sprung mass may be implemented to at least partially close the second opening in the event of a specified second deflection relative to the second partition wall. The partition walls may thus form a housing having two diametrically opposing openings, an opening state of the openings being able to be controlled by the sprung mass.

The sprung mass may be connected to at least one of the partition walls via a spring.

Furthermore, the sprung mass may have a third opening, which is situated diametrically opposite to the first opening, the third opening having a smaller cross section than the first opening. An exchange of the fluid between the two sides of the sprung mass is possible via the third opening. Because the third opening is situated diametrically opposite to the first opening, the first opening may continuously be at least partially open. An overpressure compensation is thus possible, for example.

According to one exemplary embodiment, the shock absorber may have a valve housing, which is connected to the bellows piston and is implemented to separate the volume area of the bellows piston from the volume area of the bellows, the valve housing having the first partition wall having the first opening as an upper side wall, a second partition wall having a second opening as a lower side wall, an upper cover, and a lower cover, and the sprung mass being situated inside the valve housing in such a way that the sprung mass may execute a relative movement between the upper cover and the lower cover. Relative movement is to mean here that a distance between the sprung mass and the first partition wall and a distance between the sprung mass and the second partition wall change because of the relative movement. In relation to a shared coordinate system, this may mean that either the sprung mass executes a movement and the bellows piston substantially remains at rest, or the sprung mass substantially remains at rest and the bellows piston executes a movement. If the sprung mass is implemented as a "seismic mass," the sprung mass will predominantly remain at rest. If the sprung mass is implemented as a resonance mass, the bellows piston will predominantly remain at rest.

The relative movement may run parallel to an orientation of the upper and the lower side walls.

For example, the upper and the lower side walls may be oriented at least approximately parallel to a side wall of the bellows piston. The relative movement of the sprung mass may thus be excited directly by movements of the shock absorber which are executed parallel to the side walls and thus along an action direction of the shock absorber.

The sprung mass may have an rest position in which the sprung mass may be located in an area between the first opening and the second opening and in which the sprung mass may at least partially close the first opening in the event of a relative movement toward the upper cover and may at least partially close the second opening in the event of a relative movement toward the lower cover. A fluid exchange through the openings is thus possible in the rest position.

The sprung mass may be implemented to delimit an upper space, which adjoins the upper side wall and the upper cover, from a lower space, which adjoins the lower side wall and the lower cover, in the valve housing, the sprung mass having at least one through opening which may connect the upper space to the lower space. The sprung mass may thus function as a spring-loaded piston, which may move back and forth between the upper cover and the lower cover.

An orientation of the at least one through opening may differ from an orientation of the first opening and the second opening. For example, the first and the second openings may be situated transversely in relation to the through opening.

Furthermore, the shock absorber may have a damping system situated in the valve housing.

The shock absorber may also have damping end stops, which are situated in the valve housing.

According to one specific embodiment, the shock absorber may have at least one pivot joint, which is designed to oscillatingly mount the sprung mass in relation to the bellows piston. In this way, a mass oscillator may be implemented according to the seat principle. The pivot joint may have a spring. The sprung mass may be held in a middle position with the aid of the spring.

The at least one pivot joint may be connected to the first partition wall.

Furthermore, the at least one pivot joint may have a lever arm, and a first end of the lever arm may be connected to the sprung mass and a second end of the lever arm may be connected to an oscillating mass.

The oscillating mass may have a predetermined inertia, so that the sprung mass substantially remains at rest in the event of a movement of the bellows piston to be damped, because of the predetermined inertia. In this case, the sprung mass may have a very low weight.

According to one specific embodiment, the shock absorber may have a regulating unit, which is implemented to regulate a movement of the sprung mass according to a predetermined regulating characteristic. This allows a further improvement of the damping characteristic.

For example, the regulating unit may be implemented to influence the movement of the sprung mass via a magnetic coupling. Such a coupling may be easily implemented.

For this purpose, the regulating unit may have a coil assembly or another electrical influencing assembly.

Furthermore, the shock absorber may have a brake unit, which is implemented to brake a movement of the sprung mass relative to the first partition wall. An oscillation behavior of the sprung mass may thus be influenced.

For this purpose, the brake unit may be implemented to use a pressure differential inside the shock absorber, which is produced by the movement of the sprung mass relative to the first partition wall, to produce compressed air in an accumulator, which is coupled to the shock absorber.

The brake unit may also be implemented to generate an electrical current due to a movement of the sprung mass. Energy may be reclaimed in this way.

According to one specific embodiment, the sprung mass may be implemented as a magnet. Both an influence on the movement of the sprung mass in relation to the bellows piston and also energy reclamation may thus be implemented.

According to a further specific embodiment, the sprung mass may be situated inside the bellows piston. This allows a space-saving arrangement.

Exemplary embodiments of the present invention are explained in greater detail hereafter with reference to the appended drawings.

DETAILED DESCRIPTION

Figure 1:
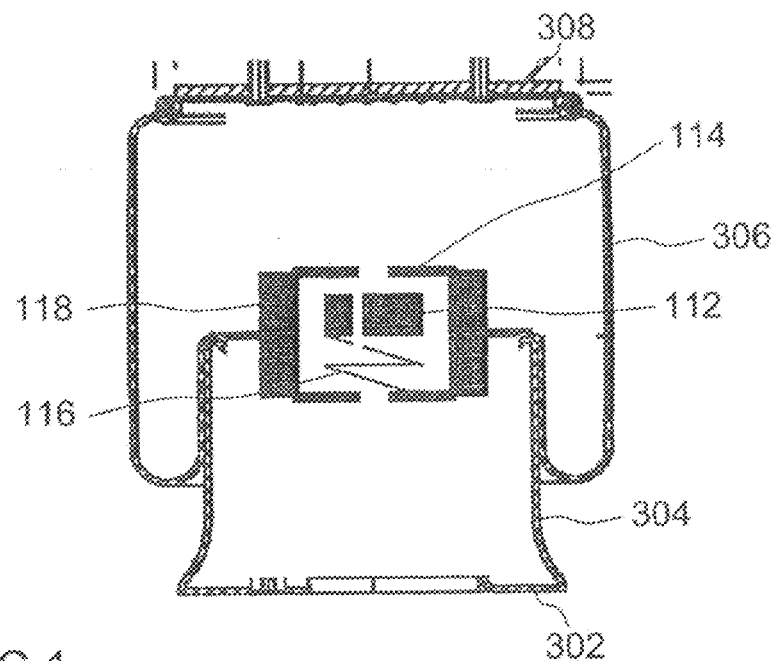
FIG. 1 shows an illustration of a bellows according to the present invention.

In the following description of the exemplary embodiments of the present invention, identical or similar reference numerals are used for the similarly acting elements, which are shown in the various drawings, a repeated description of these elements being omitted.

FIG. 1 shows a shock absorber according to an exemplary embodiment of the present invention. The shock absorber may be the air bellows described on the basis of FIG. 3, having features 302, 304, 306, 308. According to the exemplary embodiments and/or exemplary methods of the present invention, the bellows additionally has a sprung mass 112.

Sprung mass 112 is situated inside the bellows in such a way that it may influence a fluid flow between the bellows and the auxiliary volume located in the bellows piston. The fluid flow arises, for example, in the event of a compression or relaxation of the bellows. The characteristic frequency of sprung mass 112 is tuned to the characteristic frequencies of the vehicle. It may influence the fluid flow by briefly closing the connection line between bellows volume and auxiliary volume upon excitation at characteristic frequency due to the strong deflection. A higher damping force is thus achieved. According to this exemplary embodiment, the sprung mass is situated for this purpose in a transition area between bellows piston 304 and a bellows formed by bellows rubber 306 and may execute oscillating movements toward base 302 and toward bellows cover 308.

The bellows in connection with an auxiliary volume may be used to damp a movement of a mass, such as a vehicle. In order to improve the damping properties of the bellows, sprung mass 112 may have a resonant frequency, which is tuned to a resonant frequency of the mass to be stabilized by the bellows. For example, resonant frequency $f_{Res}$ of the sprung mass may correspond to the resonant frequency of the mass to be stabilized. Resonant frequency $f_{Res}$ of the sprung mass may be determined in this case according to the following formula:

$$f_{Res} = \frac{1}{2 \cdot \pi} \cdot \sqrt{\frac{c}{m}}$$

in which
c=spring stiffness of the bellows
m=weight of the mass to be stabilized.

The bellows shown in FIG. 1 may have a first partition unit 114. First partition unit 114 may be implemented as a partition wall, which separates a volume area of bellows piston 304 from a volume area of the bellows. For this purpose, first partition unit 114 may be connected to bellows piston 304. First partition unit 114 has at least one first opening. The first opening may limit the fluid flow. Sprung mass 112 may be implemented to oscillate toward first partition wall 114 and to completely or partially close the first opening in the event of a predetermined first deflection.

The bellows may have a second partition unit having a second opening. The second partition unit may be designed similarly to the first partition unit. Sprung mass 112 may be situated between first partition unit 114 and the second partition unit. Sprung mass 112 may further be designed to oscillate toward the second partition wall and to completely or partially close the second opening in the event of a predetermined second deflection. For this purpose, sprung mass 112 may be connected to one of partition units 114 via a spring 116. According to this exemplary embodiment, spring 116 is connected to the second partition unit. The volume enclosed in the bellows piston may alternatively be enlarged by further auxiliary volumes, which are not located in the bellows.

In order not to completely close the first or the second opening, sprung mass 112 may have a third opening. The third opening may be positioned in such a way that it is diametrically opposite to the first or second opening. The fluid may thus continue to flow through the third opening when sprung mass 112 presses against first or second partition unit 114. However, the fluid flow is decelerated. This is the case in particular if the third opening has a smaller cross section than the first or second opening.

If sprung mass 112 oscillates at its resonant frequency, sprung mass 112 may thus form a resonant valve for the bellows. The fluid flow within the bellows may be influenced by the resonant valve.

Furthermore, the bellows may have a regulating unit 118. Regulating unit 118 may be implemented to regulate the movement or oscillation of sprung mass 112 according to a predetermined regulating characteristic. According to the exemplary embodiment shown in FIG. 1, a coil or a similar unit for higher-order influence of the control characteristic or regulating characteristic is situated on both sides of sprung mass 112. Via a coil assembly or another electrical influencing assembly, regulating unit 118 may be implemented to decelerate or accelerate the movement of sprung mass 112 via a magnetic coupling.

The exemplary embodiment shown in FIG. 1 shows an air bellows having an auxiliary volume and a resonant valve with or without a superimposed regulator. The auxiliary volume, in which sprung mass 112 may be situated, may be provided as a damping option in bellows piston 304. A resonant valve may be installed directly in partition wall 114 between bellows 306 and piston 304.

In the event of high accelerations or large deflections, in particular at the characteristic frequency, the valve may close the overflow hole in partition wall 114. The air flow may only still escape through an overflow hole in sprung mass 112. The overflow hole in sprung mass 112 has a different cross section than the overflow hole in partition wall 114. Adapted damping is thus achieved in case of resonance.

Figure 2:
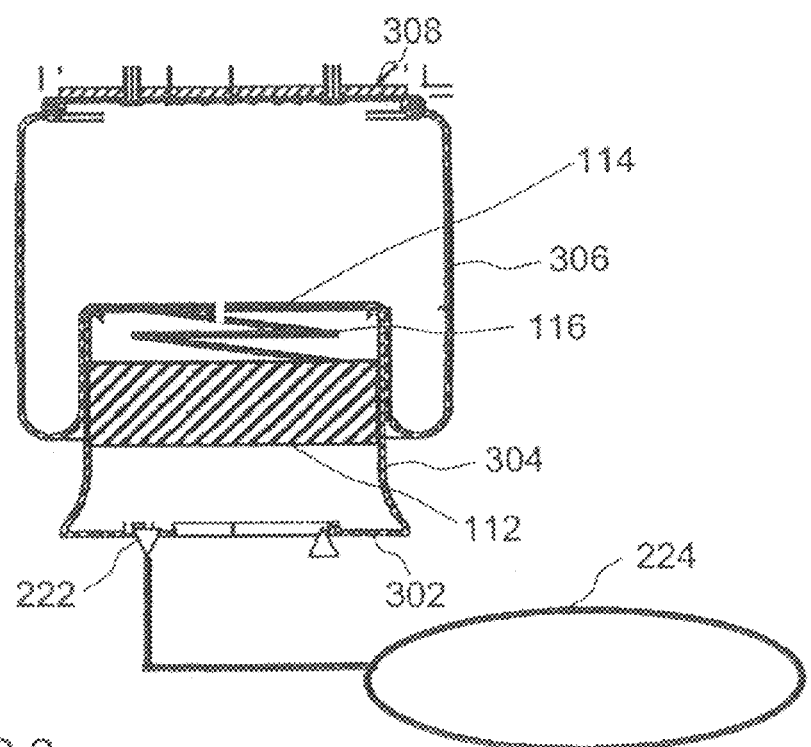
FIG. 2 shows an illustration of a further bellows according to the present invention.
Figure 3:
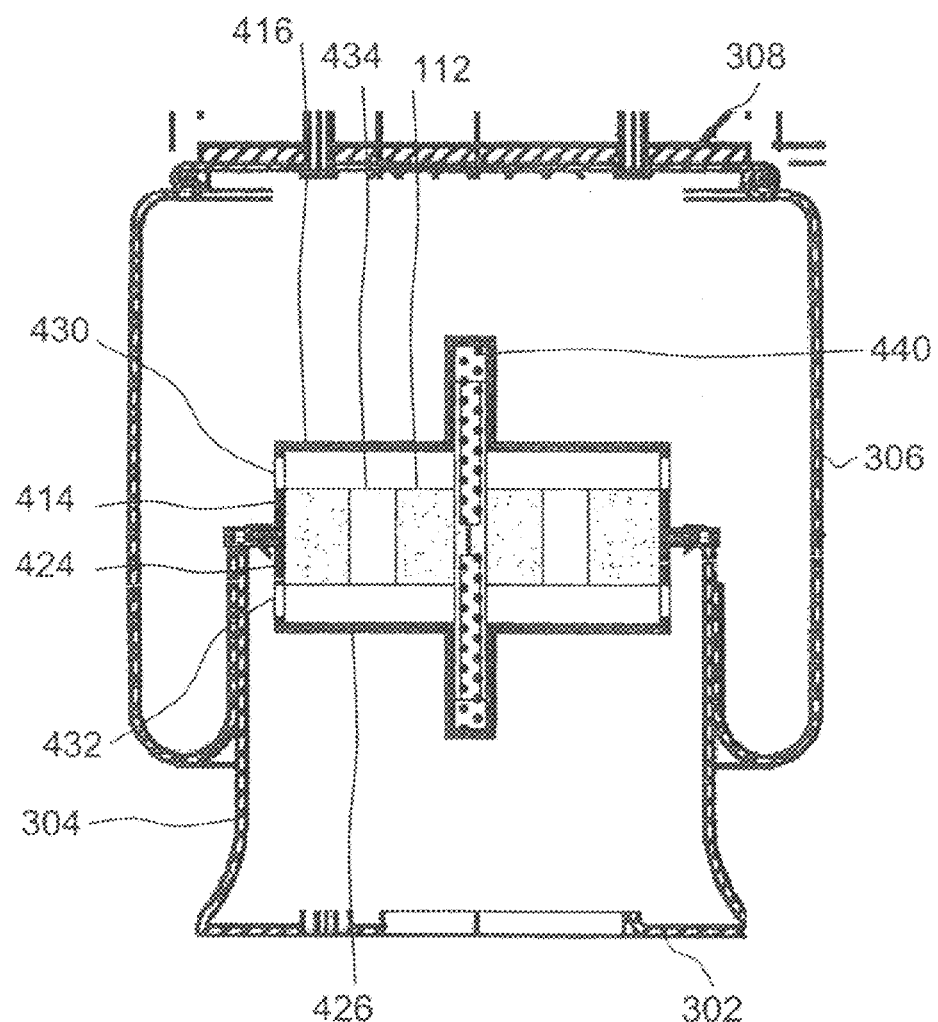
FIG. 3 shows an illustration of a further bellows according to the present invention.

FIG. 2 shows a bellows according to a further exemplary embodiment of the present invention. The bellows may again be an air bellows, as shown in FIG. 3.

Alternatively to the bellows shown in FIG. 1, according to this exemplary embodiment, damping via a throttle dissipation may be dispensed with, and instead damping may occur via vibration absorption and/or an output of technical compression work.

For this purpose, a resonant mass 112 may be installed in bellows piston 304, which oscillates at the characteristic frequency and thus produces compressed air or, alternatively, electrical current.

The bellows shown in FIG. 2 again has a sprung mass 112. Furthermore, the bellows may have a partition unit 114, which may seal bellows piston 304 in relation to bellows 306. Partition unit 114 has an opening, through which the fluid may flow. According to this exemplary embodiment, sprung mass 112 is situated inside bellows piston 304 and connected via a spring 116 to partition unit 114.

Furthermore, the bellows has a brake unit, which is implemented to brake a movement of sprung mass 112. For example, the brake unit may be implemented to exploit a pressure differential within the bellows, which is produced by the movement of sprung mass 112, to produce compressed air. For this purpose, the bellows may have at least one valve 222, via which an interior of the bellows piston may be connected to an accumulator, such as a compressed air accumulator 224. Valve 222 may be situated in base 302 of the bellows. A further valve may be provided to permit the fluid to flow back into the bellows piston when sprung mass 112 moves away from base 302. In this case, it may be an air bellows having an inertial air pump as a shock absorber without a superimposed regulator.

In an alternative embodiment, sprung mass 112 may be implemented as a permanent magnet to generate an electrical current. In this case, the electrical current may be generated by the movement of sprung mass 112, in the form of a magnet.

According to one exemplary embodiment, the approach according to the present invention may be used for suspension or damping of a vehicle and in particular of the unsprung masses of the vehicle.

Characteristic frequency $f_{eigen}$ of unsprung masses $m_R$ of the vehicle is calculated as follows:

$$f_{eigen} = \frac{1}{2 \cdot \pi} \cdot \sqrt{\frac{c_{body} + c_{tire}}{m_R}}$$

in which
$f_{eigen}$=characteristic frequency of the unsprung masses
$c_{body}$=spring stiffness of the bodywork springs
$c_{tire}$=spring stiffness of the tire
$m_R$=unsprung masses The valve according to the exemplary embodiments and/or exemplary methods of the present invention must therefore also have such a mass/stiffness ratio that characteristic frequency $f_{eigen}$ results.

The controller is similarly designed in such a way that the properties are positively influenced.

FIG. 3 shows a shock absorber according to a further exemplary embodiment of the present invention. The shock absorber may be a shock absorber having a base 302, a bellows piston 304, a bellows 306, and a bellows cover 308, as was already described on the basis of the above figures. In order to improve the damping characteristic, the shock absorber again has a sprung mass 112, which is situated in the interior of the shock absorber.

The shock absorber has a valve having a valve housing, which may be situated inside the shock absorber, for example, in a transition area between bellows piston 304 and bellows 306. The valve housing is fixedly connected to bellows piston 304, so that a movement of bellows piston 304 is transmitted directly to the valve housing. According to this exemplary embodiment, the valve housing is connected to one end of bellows piston 304, which is diametrically opposite to base 302, and protrudes both into a volume area of bellows 306 and also into a volume area of bellows piston 304. Other arrangements, for example, entirely in the interior of bellows piston 304, are also possible. The valve housing is implemented to separate the volume area of bellows piston 304 from the volume area of bellows 306.

According to this exemplary embodiment, the valve housing has an upper side wall 414, an upper cover 416, a lower side wall 424, and a lower cover 426. Side walls 414, 424 may laterally completely enclose the valve housing. Covers 416, 426 may terminate at side walls 414, 424 and thus implement the closed valve housing together with side walls 414, 424. Side walls 414, 424 may each have at least one opening 430, 432. According to this exemplary embodiment, upper side wall 414 has two diametrically opposing openings 430 and lower side wall 424 has two diametrically opposing openings 432.

Side walls 414, 424 are oriented parallel to one side wall of bellows piston 304 and thus perpendicularly to base 302 and cover 308 according to this exemplary embodiment. Side walls 414, 424 may have a cylindrical shape. Covers 416, 426 may be oriented perpendicularly to side walls 414, 424 and thus parallel to base 302 and cover 308.

Sprung mass 112 is movably situated inside the valve housing. For example, the sprung mass may be connected via spring units to upper cover 416 and/or lower cover 426. In particular, sprung mass 112 may execute a relative movement between upper cover 416 and lower cover 426. This means that sprung mass 112 and upper cover 416 may move toward one another in such a way that the distance between upper cover 416 and sprung mass 112 is minimized. In a similar way, sprung mass 112 and lower cover 426 may move toward one another in such a way that a distance between lower cover 426 and sprung mass 112 is minimized.

In a rest position, sprung mass 112 may adjoin an area of side walls 414, 424 which is between openings 430, 432. According to this exemplary embodiment, sprung mass 112 adjoins edges of openings 430, 432 in the rest position. If sprung mass 112 and upper cover 416 move toward one another, sprung mass 112 may first partially and later completely close opening 430. If sprung mass 112 and lower cover 426 move toward one another, sprung mass 112 may first partially and later completely close opening 432.

Sprung mass 112 may be designed as a disk or plate, whose circumference is adapted to side walls 414, 424. Sprung mass 112 may adjoin side walls 414, 424 in such a way that a movement of sprung mass 112 in relation to side walls 414, 424 is possible and, on the other hand, a flow of the fluid between sprung mass 112 and the side walls is prevented or at least limited.

Sprung mass 112 has at least one through opening 434. According to this exemplary embodiment, sprung mass 112 has two through openings 434. Through openings 434 may be situated symmetrically in sprung mass 112. According to this exemplary embodiment, through openings are implemented perpendicularly to surfaces of sprung mass 112 which are diametrically opposite to one another.

The fluid situated in the shock absorber may flow from the volume area of bellows 306, through opening 430, into an upper space of the valve housing, and back. The upper space is delimited by upper side wall 414, upper cover 416, and the sprung mass. From the upper space of the valve housing, the fluid may flow through through opening 434 into a lower space of the valve housing. The lower space is delimited by lower side wall 424, lower cover 426, and sprung mass 112. Furthermore, the fluid may flow from the volume area of bellows piston 304, through opening 432, into the lower space of the valve housing, and back. A flow direction of the fluid through openings 430, 432 is perpendicular to a flow direction of the fluid through opening 434.

The valve housing may have a coupling unit 440. Sprung mass 112 may be connected to the valve housing via a coupling unit 440. The connection may be produced via a plurality of springs. Furthermore, the coupling unit may have a damping system, which is implemented to damp a movement or oscillation of the sprung mass inside the valve housing. Furthermore, coupling unit 440 may have end stops, which delimit a movement of the sprung mass toward covers 416, 426. According to this exemplary embodiment, coupling unit 440 has two units, which are situated symmetrically and diametrically opposing each other.

The mass of sprung mass 112 and a spring suspension of sprung mass 112 may be selected in such a way that the sprung mass has an inertia in relation to a movement of bellows piston 304 toward cover 308 or base 302 such that sprung mass 112 remains at rest in the ideal case. The movement of bellows piston 304 may be induced, for example, by a movement of an axle of a vehicle, whose movement is to be damped by the shock absorber. For this purpose, the shock absorber may be situated between the axle and bodywork of the vehicle.

The valve housing, together with sprung mass 112, forms a valve which is situated in the shock absorber.

In the event of excitation of bellows piston 304 by a road excitation or a bodywork movement, bellows piston 304 is moved vertically. The valve housing, which is fixedly connected to bellows piston 304, executes the same movement as bellows piston 304, because it is fixedly connected to bellows piston 304, for example, screwed thereon. Very heavy valve piston 112, which is suspended in very soft springs in the interior of the valve housing, does not participate in these movements, but rather is almost at rest, in relation to base 302. Valve piston 112 thus moves in relation to the valve housing. Valve air passage holes 430, 432 are thus closed in the event of deflection and only opened in the relative valve middle position.

The damping force of the shock absorber is thus increased.

The shock absorber shown in FIG. 3 may thus be an air shock absorber, including a variable volume, namely the air bellows, a constant volume, namely the auxiliary volume, and a throttle connected between them, which regulates the gas flow. The gas may be air, for example.

Figure 13:
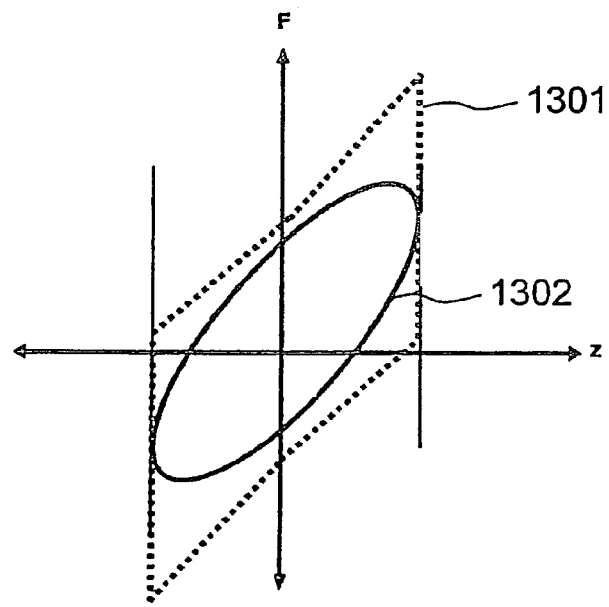
FIG. 13 shows an illustration of a force-distance graph.

On the basis of the force-distance diagram, FIG. 13 illustrates the increase of the damping force for the exemplary embodiment of a shock absorber according to the present invention shown in FIG. 3.

Because the maximum damping work is equal to area 1302 of a hysteresis curve in the force-distance diagram, the damping force may be increased by the nonlinear variation of the force over the distance, by valve switching during a sine curve.

The valve may be referred to as a valve having "seismic mass." A similar principle is used in seismic distance sensors.

In order that malfunctions may be prevented, the valve may also be expanded by an internal-valve damping system and damping end stops.

Figure 4:
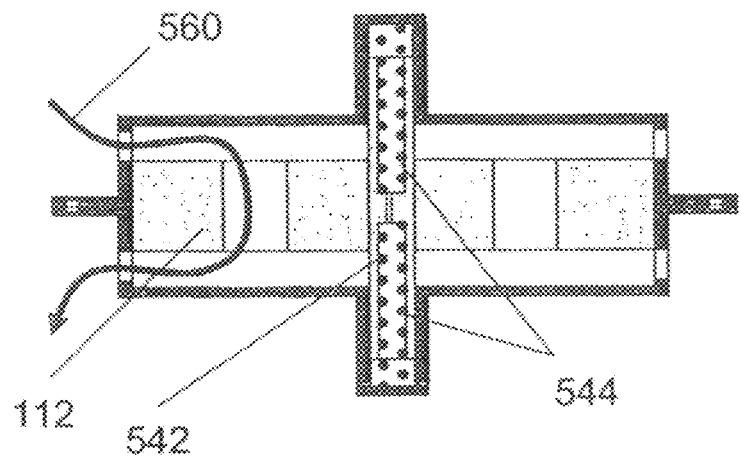
FIG. 4 shows an illustration of a valve according to the present invention.
Figure 5:
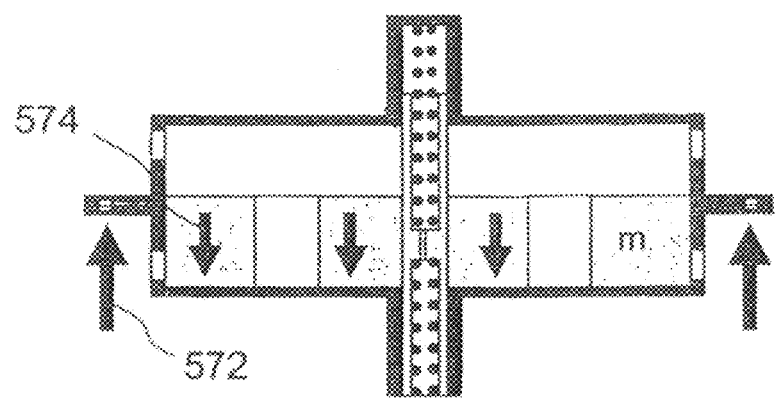
FIG. 5 shows a further illustration of the valve according to the present invention.

FIGS. 4 and 5 show detail views of the valve shown in FIG. 3. Mass oscillator 112 is designed according to the slide principle, i.e., without pressure differential influence, having mechanical springs 542, air shock absorbers 544, and rubber end stops.

FIG. 4 shows a middle position of the valve. A flow which is possible in this position is provided with reference numeral 560.

FIG. 5 shows a position of the valve in the event of an acceleration upward. Oscillating mass 112 may have a mass m. An acceleration direction is provided with reference numeral 572 and a mass force direction is provided with reference numeral 574. A pressure differential is not present according to this exemplary embodiment. Acceleration direction 572 is opposite to mass force direction 574.

Figure 6:
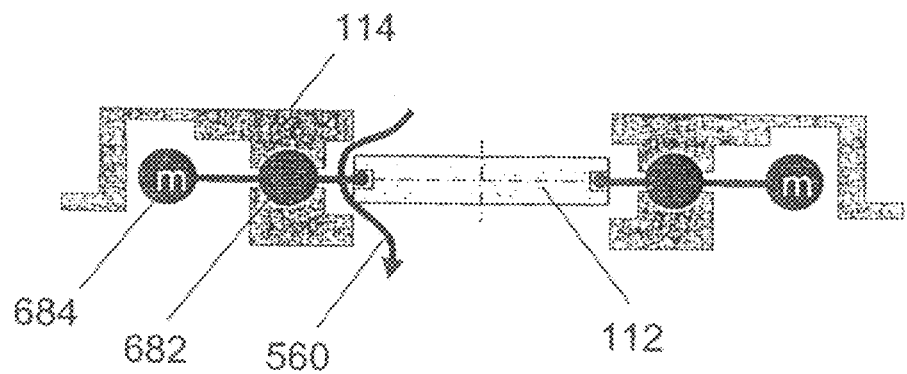
FIG. 6 shows an illustration of a further valve according to the present invention.

The valve shown in FIGS. 5 and 6 essentially includes oscillating mass 112, which may move elastically in a housing and allows air flow 560 in the middle position. If the housing is strongly accelerated, the inertia of oscillating mass 112 outweighs the spring force of spring 542 and hardly any acceleration occurs at oscillating mass 112; oscillating mass 112 remains at rest in relation to the surroundings. The air channels are thus closed and a pressure compensation is not provided. Due to the slide principle, this exemplary embodiment does not offer a surface for applying the occurring pressure differentials.

The spaces for mechanical springs 542 are simultaneously used as shock absorber volumes 544 and are therefore connected via an optionally adjustable throttle hole according to this exemplary embodiment. If the acceleration drops off, which is the case before every dead center, the spring force finally predominates again, the oscillating mass moves back to the middle and thus briefly allows air compensation close to the dead center. An acceleration in the opposite direction typically results thereafter, which results in further closing of the air flow, this time the holes of the diametrically opposite side.

It is apparent that oscillating mass 112, spring stiffness, and damping must be adjusted and adapted to one another so that the ideal opening and closing times are met.

Figure 7:
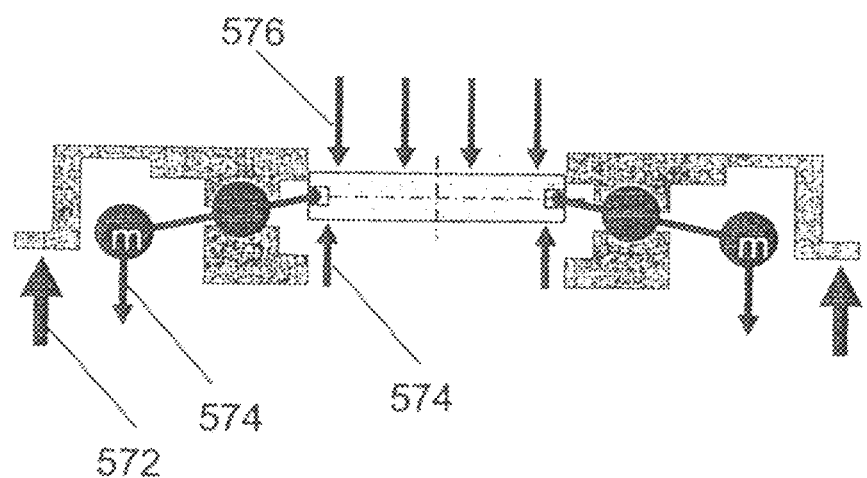
FIG. 7 shows a further illustration of the further valve according to the present invention.

FIGS. 6 and 7 show a valve according to a further exemplary embodiment of the present invention. The valve may be used instead of the valve shown in FIG. 3 in a bellows, for example, and may be situated similarly to the valve shown in FIG. 3. A first partition wall 114 of the valve may be fixedly connected to a piston of a bellows, similarly to the valve housing shown in FIG. 3, and may separate a volume area of the piston from a volume area of the bellows. The valve shown in FIGS. 6 and 7 is a mass oscillator according to the seat principle having maximum pressure limiting.

In FIG. 6, the valve is shown in the middle position. Two oscillating masses 684 are shown, which are each connected via a pivot joint 682 to a closure plate 112. Oscillating masses 684 thus form a sprung mass together with closure plate 112. According to this exemplary embodiment, the mass of closure plate 112 may be less than the masses of oscillating masses 684. Pivot joints 682 may each be implemented as a spring-loaded pivot joint. More or fewer than two pivot joints 682 shown may also be used. Closure plate 112 is situated between first partition wall 114 and a second partition wall, which are situated diametrically opposing one another. First partition wall 114 has a first opening and the second partition wall has a second opening. The first opening is situated diametrically opposing the second opening. Pivot joints 682 are situated between first partition wall 114 and the second partition wall. Oscillating masses 684 are each situated on a side of corresponding pivot joint 682 diametrically opposing closure plate 112. Oscillating masses 684 may each be connected via a lever, which is mounted in particular pivot joint 682, to closure plate 112. The levers may be movably connected to closure plate 112. Pivot joints 682 allow a movement of closure plate 112 and oscillating masses 684 relative to first partition wall 114. Closure plate 112 may approach first partition wall 114 to the point that the first opening in first partition wall 114 is closed by closure plate 112. In a similar way, closure plate 112 may approach the second partition wall to the point that the second opening in the second partition wall is closed by closure plate 112. Depending on the specific embodiment, the first and the second openings may be completely or at least partially closed by closure plate 112.

According to this exemplary embodiment, closure plate 112 has a diameter which is adapted to the first opening in partition wall 114, so that closure plate 112 may move at least partially into the first opening. Because of pivot joints 682, oscillating masses 684 execute a movement opposite to closure plate 112. For example, closure plate 112 moves toward first partition wall 114 when oscillating masses 684 move away from first partition wall 114. The first partition wall may have recesses in the area of oscillating masses 684 which allow a similar movement of oscillating masses 684. Oscillating masses 684 may each have a mass m.

In the middle position shown in FIG. 6, a flow 560 is possible through the first and the second openings, past closure plate 112. For this purpose, first partition wall 114 and the second partition wall may have an appropriate recess in the area of the middle position of closure plate 112.

In the position shown in FIG. 7, closure plate 112 closes the first opening in the event of acceleration upward, so that no flow is possible through the first opening.

An acceleration direction is provided with reference numeral 572 and a mass force direction is provided with reference numeral 574. A pressure differential is provided with reference numeral 576. Acceleration direction 572 is identical to the mass force direction 574 on the closure plate and opposite to the mass force direction 574 on oscillating masses 112 and the direction of pressure differential 576.

The valve shown in FIGS. 6 and 7 essentially includes a housing, including first partition wall 114 and the second partition wall, one or more levers, which receive oscillating masses 112 on one side, and a very light closure plate 112, which allows or prevents air flow 560. Closure plate 112 is connected like a pivot joint to the other side of the lever and/or levers.

The levers may also be attached radially around the valve center point and may thus be manufactured from one part, similar to a diaphragm spring of a clutch.

If the bellows piston (shown in FIG. 3) and thus the valve housing are accelerated upward, oscillating masses 112 remain more or less at rest relative to the surroundings because of their inertia. A rotational movement thus arises in pivot joints 682 and closure plate 112 closes the air flow channel. During the acceleration upward, the movable volume, i.e., the bellows (shown in FIG. 3), is compressed, so that a pressure differential is caused between the closure plate upper side and lower side. This results in a force component downward, which increases with rising pressure differential. This component may be used as an overload protection for the valve.

Adjustment of the areas, masses, and the spring and shock absorber elements for a specific purpose is also to be ensured in this type of valve.

Figure 8:
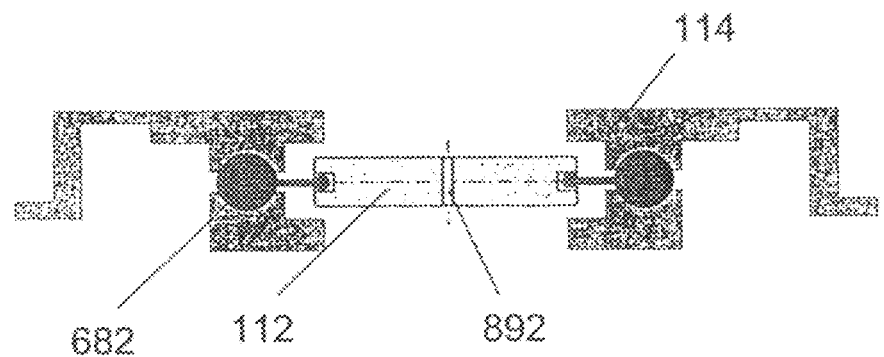
FIG. 8 shows an illustration of a valve according to a further exemplary embodiment.
Figure 9:
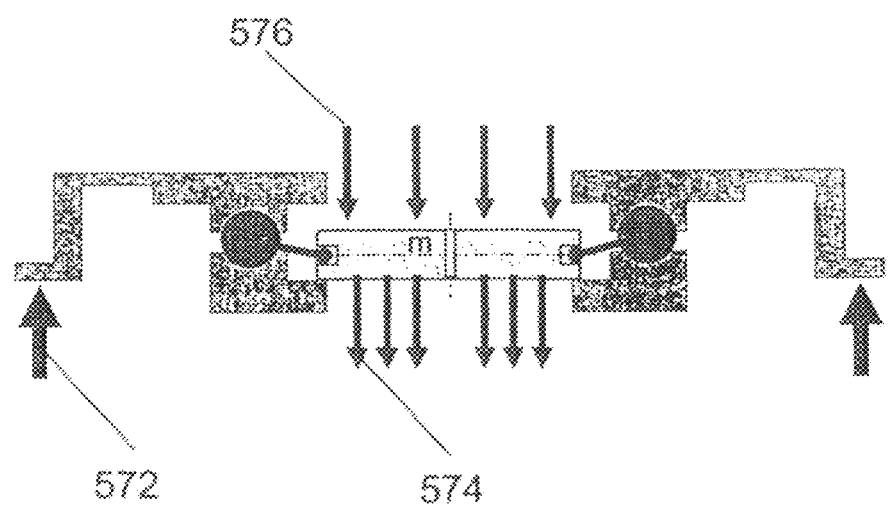
FIG. 9 shows a further illustration of the valve according to the further exemplary embodiment.

FIGS. 8 and 9 show a valve according to a further exemplary embodiment of the present invention. The valve may be used in a bellows, similarly to the valve shown in FIG. 3, for example, and may be situated similarly to the valve shown in FIG. 3. The valve shown in FIGS. 8 and 9 is a mass oscillator according to the seat principle having a pressure amplification and an extreme pressure throttle.

The valve is shown in the middle position in FIG. 8. An oscillating mass 112, which is situated similarly to the closure plate shown in FIG. 6, is shown. Oscillating mass 112 is connected to two pivot joints 682 according to this exemplary embodiment. Oscillating mass 112 may be movably connected in each case to particular pivot joint 682 via a lever. Alternatively, more or fewer than two pivot joints 682 shown may also be used. Pivot joints 682 may be spring-loaded pivot joints 682. Because of the mounting, oscillating mass 112 may again close the first opening in first partition wall 114 and the second opening in the second partition wall. Oscillating mass 112 may have a diameter which is greater in each case than a diameter of the first and second openings. Oscillating mass 112 may thus strike first partition wall 114 during a movement in the direction thereof and thus close the first opening. Similarly thereto, oscillating mass 112 may strike the second partition wall during a movement in the direction thereof and thus close the second opening.

Oscillating mass 112 may have an extreme pressure throttle 892, which is implemented according to this exemplary embodiment as a through hole. The through hole may have a substantially smaller diameter than the first opening. Oscillating mass 112 may have a mass m.

In the middle position shown in FIG. 8, a flow through the first and the second openings past oscillating mass 112 is again possible.

In the position shown in FIG. 9, in the event of acceleration upward, oscillating mass 112 closes the second opening, so that a small flow through the second opening is only possible through the extreme pressure throttle.

An acceleration direction is provided with reference numeral 572 and a mass force direction is provided with reference numeral 574. A pressure differential is provided with reference numeral 576. Acceleration direction 572 is opposite to the mass force direction 574 and to the direction of pressure differential 576.

The valve shown in FIGS. 8 and 9 may thus include the same components as the valve shown in FIGS. 6 and 7, with the difference that, according to this exemplary embodiment, oscillating mass 112 and the closure plate are the same part. This means that closure plate 112 must be very heavy, so that it remains seismically at rest. In the event of an acceleration upward, oscillating mass 112 again remains at rest, so that the air flow channel closes. In this case, however, a large pressure differential results in still more amplified closure forces. This may result in delayed reopening of the throttle. This may be solved to a certain degree by an extreme pressure throttle 892, which may compensate, in a controlled manner, for a higher-than-average pressure differential. In addition, this problem may also be influenced by targeted design of masses, areas, and spring or shock absorber properties.

In FIGS. 3 through 9, valves for air shock absorbers are shown in which, because of soft springs and large masses, channels close at the dead centers or close to the dead centers. A pressure independence may be provided by a slide principle. Furthermore, an integrated air shock absorber may be provided for damping the oscillating mass piston. An overload safety may be provided for the valves shown. In the valve shown in FIGS. 6 and 7, the overload safety may be implemented by a lever mechanism. Furthermore, a pressure amplifier and an extreme pressure throttle may be provided, which only act at a defined pressure differential delta-p.

The pivot joints may contain rubber springs.

Figure 10:
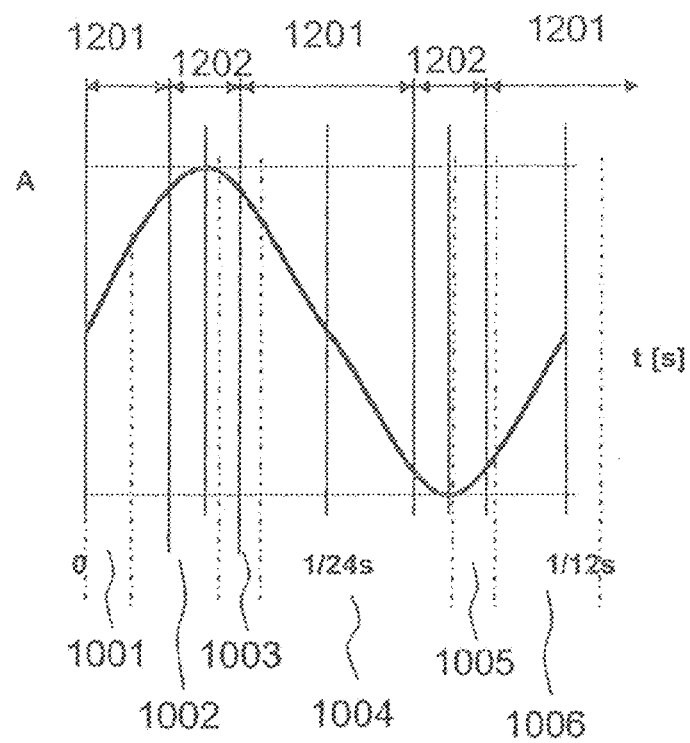
FIG. 10 shows a graph of a throttle principle according to the present invention.
Figure 11:
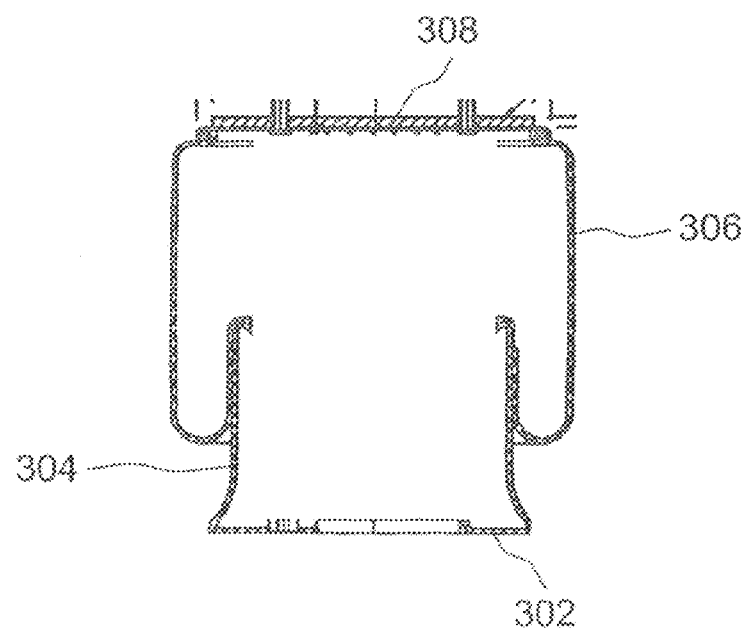
FIG. 11 shows an illustration of a bellows according to the related art.
Figure 12:
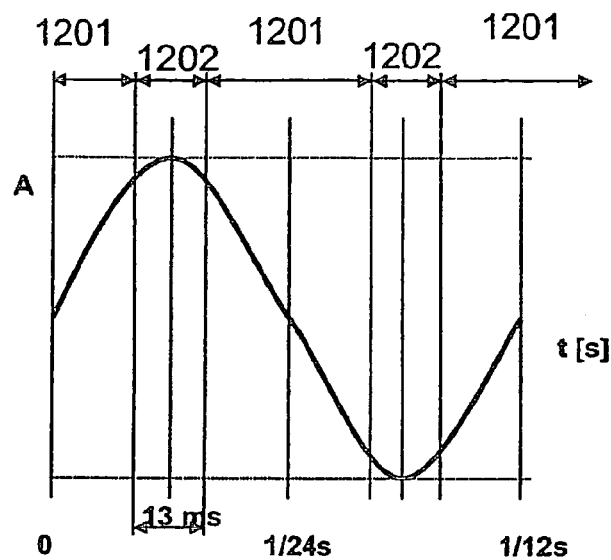
FIG. 12 shows an illustration of ideal throttle positions.

FIG. 10 shows a throttle principle which is the foundation in particular of the exemplary embodiments shown in FIGS. 3 through 9. Similarly to FIG. 12, time t is plotted on the abscissa and amplitude A is plotted on the ordinate. Time intervals 1201 identify states in which the throttle is to be closed and time intervals 1202 identify states in which the throttle is to be open. Time intervals 1201, 1202 thus identify setpoint states. Time intervals 1001, 1002, 1003, 1004, 1005, 1006 identify actual states. Time interval 1001 identifies the state "throttle open, as briefly as possible," time interval 1002 identifies the state "throttle closed, as briefly as possible after top dead center," time interval 1003 identifies the state "throttle open, as briefly as possible," time interval 1004 identifies the state "throttle closed, as briefly as possible after top dead center," time interval 1005 identifies the state "throttle open, as briefly as possible," and time interval 1006 identifies the state "throttle closed, as briefly as possible after top dead center."

Principle-related deviations between setpoint and actual may be seen, which may be substantially reduced upon skilled selection of the parameters, however.

In the exemplary embodiments, not only is a mechanical spring explicitly considered as a spring, but rather also as a gas spring, having its known nonlinear curve.

The exemplary embodiments and/or exemplary methods of the present invention thus also relates to a shock absorber, such as a gas spring shock absorber, having a compressible fluid as the damping medium. The shock absorber has a sprung mass, which is situated inside the shock absorber in order to influence a fluid flow inside the shock absorber or to damp itself by mass inertia.

The described exemplary embodiments are only selected as examples and may be combined with one another. The approach according to the exemplary embodiments and/or exemplary methods of the present invention is not limited to the described air bellows. The air bellows is to be representative here for springs or shock absorbers which have a fluid, in order to provide a spring or damping action. The resonant frequency of the sprung mass may be adjustable, for example, via an adaptation of the weight of the sprung mass or of the spring stiffness of the spring of the sprung mass.

The List of Reference Numerals is as Follows 112 sprung mass
114 partition unit
116 spring
118 regulating unit
222 valve
224 accumulator
302 base
304 bellows piston
306 bellows
308 bellows cover
414 upper side wall
416 upper cover
424 lower side wall
426 lower cover
430, 432 openings
434 through opening
440 coupling unit
542 spring
544 air shock absorber
560 flow
572 acceleration direction
574 mass force direction
576 pressure differential
682 pivot joint
684 oscillating mass 892 extreme pressure throttle
1001, 1002, 1003, 1004, 1005, 1006 actual states
1201, 1202 setpoint states
1301, 1302 areas

The invention claimed is:

1. A shock absorber for a vehicle, comprising:
a bellows piston;
a bellows;
a fluid as a damping medium;
a sprung mass situated inside the shock absorber to influence the fluid flow inside the shock absorber;
wherein a first partition wall is situated on the bellows piston and configured to separate a volume area of the bellows piston from a volume area of the bellows, wherein a first opening in the first partition wall is configured to limit a fluid flow between the volume area of the bellows piston and the volume area of the bellows,
wherein the sprung mass is configured as a magnet, and
wherein the sprung mass can relatively move between an upper cover and a lower cover, so that the sprung mass and the upper cover can move toward one another so that the distance between the upper cover and the sprung mass is minimized, and wherein the sprung mass and the lower cover can move toward one another so that a distance between the lower cover and sprung mass is minimized.

2. The shock absorber of claim 1, wherein the sprung mass has a predetermined inertia, so that the sprung mass remains substantially at rest in the event of a movement of the bellows piston to be damped because of the predetermined inertia.

3. The shock absorber of claim 1, wherein the sprung mass has a resonant frequency, which is tuned to a resonant frequency of a mass to be stabilized by the damper.

4. The shock absorber of claim 1, wherein the sprung mass is configured to at least partially close the first opening in the event of a predetermined first deflection relative to the first partition wall.

5. The shock absorber of claim 1, wherein there is a second partition wall having a second opening, wherein the sprung mass is situated between the first and the second partition walls, and wherein the sprung mass is configured to at least partially close the second opening in the event of a predetermined second deflection relative to the second partition wall.

6. The shock absorber of claim 1, wherein the sprung mass is connected via a spring to one of the partition walls.

7. The shock absorber of claim 1, wherein the sprung mass has a third opening, which is situated diametrically opposing the first opening, the third opening having a smaller cross section than the first opening.

8. The shock absorber of claim 1, further comprising:
a valve housing connected to the bellows piston and configured to separate the volume area of the bellows piston from the volume area of the bellows, wherein the valve housing has the first partition wall having the first opening as an upper side wall, a second partition wall having a second opening as a lower side wall, an upper cover, and a lower cover, and the sprung mass is situated inside the valve housing so that the sprung mass may execute a relative movement between the upper and the lower covers.

9. The shock absorber of claim 8, wherein the relative movement is parallel to an orientation of the upper and the lower side walls.

10. The shock absorber of claim 8, wherein the upper side wall and the lower side wall are oriented at least approximately parallel to a side wall of the bellows piston.

11. The shock absorber of claim 8, wherein the sprung mass has a rest position, in which the sprung mass is located in an area between the first opening and the second opening, and the sprung mass at least partially closes the first opening in the event of a relative movement toward the upper cover, and at least partially closes the second opening in the event of a relative movement toward the lower cover.

12. The shock absorber of claim 8, wherein the sprung mass is configured to delimit an upper space, which adjoins the upper side wall and the upper cover, from a lower space, which adjoins the lower side wall and the lower cover, in the valve housing, the sprung mass having at least one through opening, which connects the upper space to the lower space.

13. The shock absorber of claim 12, wherein an orientation of the at least one through opening differs from an orientation of the first opening and the second opening.

14. The shock absorber of claim 8, further comprising:
a damping system situated in the valve housing.

15. The shock absorber of claim 8, further comprising:
damping end stops situated in the valve housing.

16. The shock absorber of claim 1, wherein having at least one pivot joint, which is configured to mount the sprung mass to oscillate relative to the bellows piston.

17. The shock absorber of claim 16, wherein the at least one pivot joint is connected to the first partition wall.

18. The shock absorber of claim 16, wherein the at least one pivot joint has a lever arm, and a first end of the lever arm is connected to the sprung mass and a second end of the lever arm is connected to an oscillating mass.

19. The shock absorber of claim 18, wherein the oscillating mass has a predetermined inertia, so that the sprung mass remains substantially at rest in the event of a movement of the bellows piston to be damped, because of the predetermined inertia.

20. A shock absorber for a vehicle, comprising:
a bellows piston;
a bellows;
a fluid as a damping medium;
a sprung mass situated inside the shock absorber to influence the fluid flow inside the shock absorber; and
a regulating unit configured to regulate a movement of the sprung mass according to a predetermined regulating characteristic;
wherein a first partition wall is situated on the bellows piston and configured to separate a volume area of the bellows piston from a volume area of the bellows, wherein a first opening in the first partition wall is configured to limit a fluid flow between the volume area of the bellows piston and the volume area of the bellows,
wherein the regulating unit is configured to influence the movement of the sprung mass via a magnetic coupling, and
wherein the sprung mass can relatively move between an upper cover and a lower cover, so that the sprung mass and the upper cover can move toward one another so that the distance between the upper cover and the sprung mass is minimized, and wherein the sprung mass and the lower cover can move toward one another so that a distance between the lower cover and sprung mass is minimized.

21. The shock absorber of claim 20, wherein the regulating unit has one of a coil assembly and another electrical influencing assembly.

22. The shock absorber of claim 1, further comprising:
a brake unit configured to brake a movement of the sprung mass relative to the first partition wall.

23. The shock absorber of claim 22, wherein the brake unit is configured to use a pressure differential inside the shock absorber, which is produced by the movement of the sprung mass relative to the first partition wall, to produce compressed air in an accumulator, which is coupled to the shock absorber.

24. The shock absorber of claim 22, wherein the brake unit is configured to generate an electrical current due to a movement of the sprung mass.

25. The shock absorber of claim 1, wherein the sprung mass is situated inside the bellows piston.

* * * * *